Patented Oct. 29, 1929

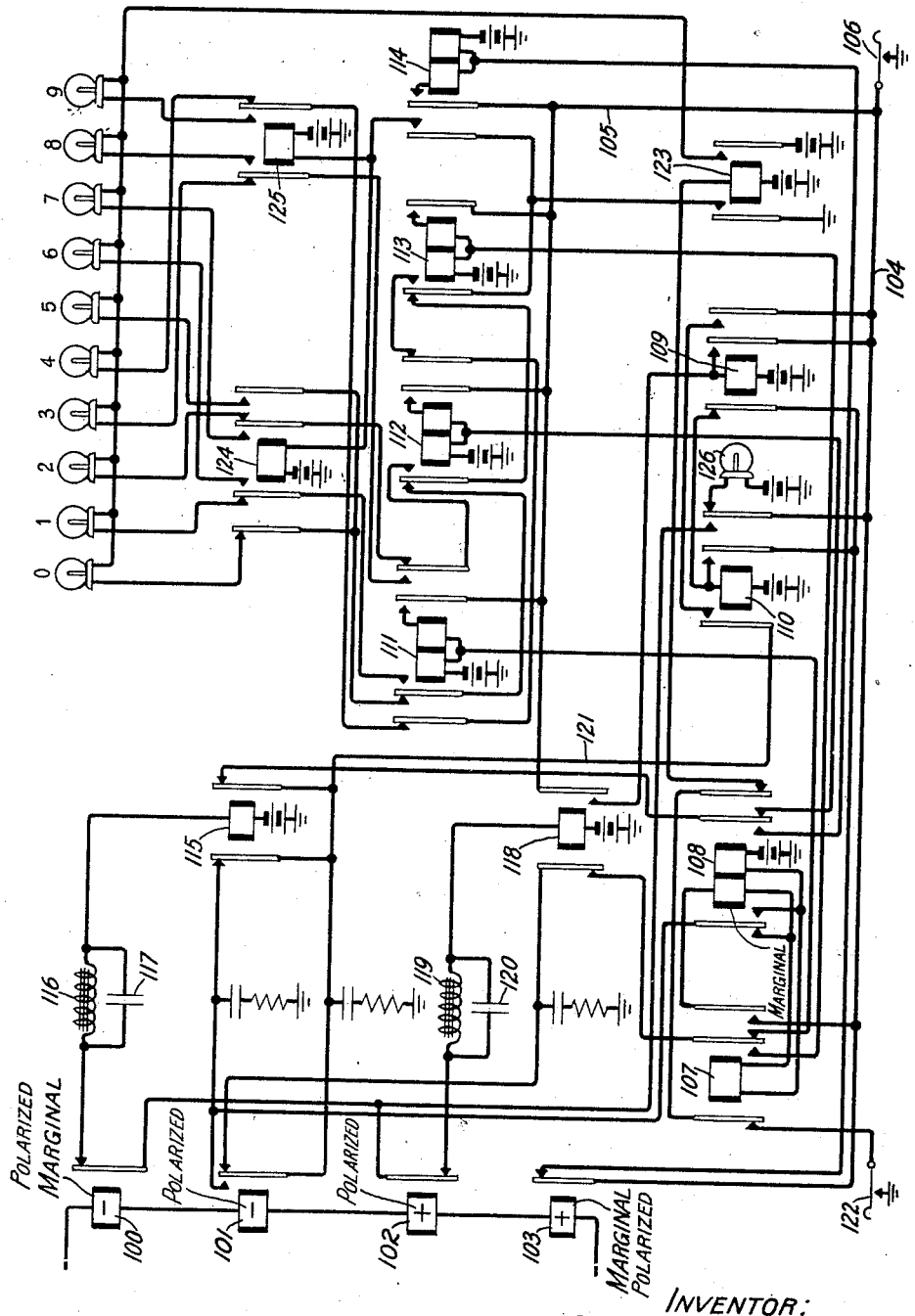

1,733,617

UNITED STATES PATENT OFFICE

CHARLES R. MEISSNER, OF MADISON, NEW JERSEY, ASSIGNOR TO BELL TELEPHONE LABORATORIES, INCORPORATED, OF NEW YORK, N. Y., A CORPORATION OF NEW YORK

SIGNALING SYSTEM

Application filed December 15, 1927. Serial No. 240,125.

This invention relates to telephone systems and more particularly to means for prolonging the effect of relays employed in such systems.

Very brief closures or openings of the contacts of a relay may result either in the false operation or the failure to operate of apparatus depending thereon. In accordance with the present invention means has been provided whereby the effect of a momentary opening of a relay contact is prolonged. This consists of a tuned circuit interposed between the contact and the apparatus to be controlled thereby.

This invention has found one specific embodiment in testing the pulsing performed by full mechanical senders. Lack of adjustment of such an impulser due to wear or other reasons may result in the sending of short pulses between those intended, which pulses may result in the false setting of the receiving apparatus. It is desirable therefore in making a test of a sender to detect the sending of such short impulses before they become of sufficient duration to affect the service receiving apparatus. The customary testing arrangement differs from the equipment used in service only by being slightly more sensitive. It is therefore possible to detect false impulses only after they become nearly long enough to operate the recording equipment. By means of the present invention it is possible to prolong the false short impulses to permit their detection and the subsequent adjustment of the impulser while the pulses are still far too short to produce false numbers in service. Means is also provided for stopping the test whenever a heavy positive pulse, which is always a false pulse, is received.

The drawing shows a portion of a sender testing equipment including the relays for receiving the pulses from the sender, one set of register relays with associated lamps for recording the number received and the arrangement of the present invention for prolonging short impulses. The arrangement shown may form a part of a complete sender testing equipment such as disclosed in United States Patent 1,628,997 to J. B. Retallack, granted May 17, 1927. It is, of course, understood that the invention is not limited to use in such a system, nor to the testing of senders, nor to testing in general.

The equipment shown comprises relays 100, 101, 102 and 103 which are connected in any suitable manner to a fundamental circuit extending to the sender under test. It is well known that relay call indicators are operated by means of code impulses made up of light positive pulses, light negative pulses, and heavy negative pulses. Relays 101 and 102 are sensitive so as to respond to light pulses, and are polarized so that relay 101 responds to negative pulses only and relay 102 to positive pulses only. Relays 100 and 103 are marginal so that they respond only to heavy pulses. In addition relay 103 is polarized so as to respond only to positive pulses and relay 100 is polarized to respond only to negative pulses. A cycle of pulses corresponding to a single digit provides intervals for four pulses, the first and third of which may be positive and the second and fourth of which are always negative and may or may not be heavy. The light negative pulses operate relay 101 which in turn serves to operate the pair of relays 107 and 108 through a cycle of operations for each cycle of pulses. Normally relays 102 and 100 respond to the light positive and heavy negative pulses, respectively, recording the code itself while relays 107 and 108 direct the circuits controlled by relays 100 and 102 to the proper recording relays. The first positive pulse, if any, causes the operation of relay 111; the first heavy negative pulse, of relay 112; the second positive pulse, of relay 113; and the second heavy negative pulse, of relay 114. These relays operate in different combinations according to the code received and lock up to provide a circuit for lighting the lamp corresponding to the digit represented by that code. In a complete system, relays 107 and 108 also control transfer relays so that each cycle of pulses, which represents a different digit of a number being transmitted, will be recorded on a separate register. Since a multiplicity of registers is not necessary for an understanding of the present invention only one has been shown.

For a complete showing of such transfer relays and registers, reference is made to United States Patent 1,464,084 to Lundell and Clark, August 7, 1923.

Assuming that the receiving equipment is ready to receive pulses, ground will be connected to conductors 104 and 105 in any suitable manner, key 106 having been shown for this purpose. The connection of ground to conductor 104 completes a circuit over the back contact of relay 103, back contact of relay 109, winding of relay 110 to battery. Relay 110 operates and locks over its inner right front contact and back contact of relay 103, to grounded conductor 104. The operation of relay 110 completes a circuit from battery through the winding of relay 115, retardation coil 116, back contact of relay 100, outer right front contact of relay 110, to grounded conductor 104. It also completes a circuit from battery through the winding of relay 118, retardation coil 119, back contact of relay 102, outer right front contact of relay 110, to grounded conductor 104. Relays 115 and 118 operate. The operation of relay 118 in connection with the grounding of conductor 105 completes a circuit from battery through the winding of relay 109, front contact of relay 118, to grounded conductor 105. Relay 109 operates and locks over its inner right front contact to grounded conductor 104, opening the operating circuit of relay 110.

Assume that a code consisting of a light positive pulse, a heavy negative pulse, no pulse, and a heavy negative pulse is to be received. The first pulse will cause the operation of relay 102. This opens the circuit of relay 118 and that relay releases. A circuit is thereupon closed from battery through left winding of relay 111, right back contact of relay 107, back contact of relay 118, back contact of relay 101, conductor 121, left front contact of relay 110, outer right front contact of relay 109 to grounded conductor 104. Relay 111 operates and locks through its two windings to grounded conductor 105.

Upon the reception of the second pulse, relays 101 and 100 operate. The operation of relay 100 opens the circuit of relay 115 and that relay releases. A circuit is then closed from battery through the left winding of relay 112, inner right back contact of relay 108, right back contact of relay 115, conductor 121, left front contact of relay 110, outer right front contact of relay 109 to grounded conductor 104. Relay 101 in operating closes a circuit from battery through the right winding of relay 108, winding of relay 107, left back contact of relay 108, front contact of relay 101, conductor 121, and thence to ground as above traced. Relay 107 operates, but relay 108 cannot operate in this circuit. The operation of relay 107 closes a locking circuit from battery through the right winding of relay 108, winding of relay 107, left winding of relay 108, outer right front contact of relay 107 to grounded conductor 104. The operating circuit of relay 107 in shunt of the left winding of relay 108 prevents relay 108 from operating at this time. When relay 101 opens its front contact at the end of the pulse, this shunt is opened and relay 108 operates.

During the next pulse period, no pulse is received; relay 102 is not energized; and relay 118 remains operated, holding the operating circuit for relay 113 open at its left contact.

At the fourth pulse, relays 101 and 100 are again operated. Since relay 108 is operated at this time the circuit of relay 114 is completed from battery through the right winding of relay 114 over the right front contact of relay 108, back contact of relay 115, conductor 121, to ground as above traced. The operation of relay 101 closes a circuit from battery through the right winding of relay 108, left front contact of relay 108, front contact of relay 101, conductor 121 to ground. Relay 108 is held operated in this circuit, but relay 107 is shunted by it and releases. At the end of the pulse, the circuit of relay 108 is opened and that relay also releases returning the pair of relays 107 and 108 to condition for receiving the next cycle of pulses.

With relays 111, 112 and 114 operated a circuit is prepared for lighting the No. 8 lamp which circuit may be completed by the operation of display key 122. The operation of key 122 closes a circuit from ground over key 122, left back contact of relay 107, outer right back contact of relay 108, winding of relay 123 to battery. Relay 123 operates supplying ground and battery for the lighting of the lamp. Since relay 114 is operated a circuit is also closed from ground at the left front contact of relay 123, outer front contact of relay 114, windings of relays 124 and 125 in parallel to battery. The lamp circuit may therefore be traced from battery over the right front contact of relay 123, through lamp No. 8, left front contact of relay 125, outer right front contact of relay 111, left front contact of relay 112, left back contact of relay 113 to ground at the left contact of relay 123.

The description heretofore given has ignored the delay arrangement embodying the invention and controlled by relays 100 and 102. This delay circuit consists of the retardation coil 116, and condenser 117 in proper relation to the relay 115, coil 119, condenser 120 and relay 118 also embody the invention. As before indicated relay 115 is operated prior to the commencement of impulse reception so that there is a steady current flow through the windings of relay 115 and coil 116. When relay 100 operates, this circuit is opened and the inductive flux set up in coil 116, charges condenser 117 to a high potential. This potential then discharges through the retardation coil and an oscillatory condition is set up in the tuned circuit comprising inductance 116 and condenser 117. These oscillations take a time to die out determined by the relationship between the capacity of the condenser and the inductance of the coil and their design. These values are so adjusted that the oscillations die out well within the period that relay 100 is operated in response to normal pulses. However, if relay 100 is operated very briefly, reclosing the circuit of relay 115 before the oscillations die down, these oscillations will discharge through relay 115 whose impedance is made small as compared with that of coil 116 for this purpose. If the opening of the circuit of relay 115 is in the order of one half of the period of the oscillations, the condenser discharge actually reverses the direction of current flow through relay 115. Thereafter the effect of the oscillations on relay 115 is to completely demagnetize it and to delay the building up of direct current through the relay due to the reclosure of the contact of relay 100.

For short openings the time of the opening plus the time during which the oscillations discharge is approximately constant because the shorter the openings are the stronger will be the discharge current since the oscillations are less attenuated and the greater its demagnetizing effect. Due to this demagnetizing effect of the oscillatory discharge, the relay starts to reenergize from complete demagnetization and its time of operation is therefore very nearly constant.

The adjustment of the armature of relay 115 is rather stiff so as to make it quick to release and somewhat slow to operate. It therefore releases instantly following the operation of relay 100 and remains released through the operated time of relay 100, the discharge period of the oscillations, and its own energizing period which is increased by the necessity of building up current through retardation coil 116. Since the last two periods are adjustable it is possible to select apparatus for an arrangement of this sort having such characteristics as to render the momentary operation of a relay effective on recording equipment having normal operating periods in excess thereof without interfering with the response of the recording equipment to full length openings. For example in its present application breaks of .006 seconds duration at the contact of relay 100 can be employed to operate relays such as relay 111, having a normal operating period of .020 seconds.

The false pulses likely to occur in a relay call indicator impulsing arrangement are heavy negative pulses at the beginning or end of a light negative pulse, a light positive pulse at the beginning or end of a period when no pulse should be sent, and a heavy positive pulse. Since a heavy positive pulse is always a false pulse, relay 103 has been inserted in the pulse receiving circuit for detecting such a pulse. It will be remembered that the locking circuit of relay 110 extends over the back contact of relay 103 and that the operating circuit of relay 110 is opened by the operation of relay 109. Therefore should a heavy positive pulse be received, the operation of relay 103 immediately releases relay 110. A circuit is then closed from battery through lamp 126, right back contact of relay 110, to grounded conductor 104. The release of relay 110 also disconnects ground from conductor 121, and therefore from the operating circuit for relays 107 and 108, as well as from the register relays 112 and 114. It also disconnects ground from the armatures of relays 100 and 102 releasing relays 115 and 118. Pulses continue to be received by relays 100 to 103 but are ineffective on the recording circuit. After an interval an alarm (not shown) informs the person conducting the test that the test has failed and the lighting of lamp 126 indicates that a heavy positive pulse has been received.

In the case of false heavy negative pulses or false light positive pulses, the corresponding register relays will be operated and when the lamps are checked against the setting of the sender either automatically or visually, an indication will be obtained of the points at which the sender impulser is out of adjustment.

While the delay arrangement of the present invention has been applied in detail to the testing of a relay call indicator impulser, it is, of course, obvious that it might be applied to the testing of any sort of impulse transmitter, and that it may be applied with advantage to signaling systems where for any reason impulses may be shortened beyond the operating limits of apparatus to be controlled thereby.

What is claimed is:

1. In a telephone system, a relay, a contact for said relay, apparatus controlled by said contact, and means for prolonging the effect of a momentary opening of said contact to effect the operation of said apparatus, said means comprising a retardation-coil, a condenser and a second relay interposed between said contact and said apparatus.

2. In a telephone system, a relay, a contact for said relay, apparatus controlled by said contact, and means for prolonging the effect of a momentary opening of said contact to effect the operation of said apparatus, said means comprising a retardation-coil and a condenser in parallel, and a second relay interposed between said contact and said apparatus.

3. In a telephone system, a relay, a contact for said relay, apparatus controlled by said contact, and means for prolonging the effect of a momentary opening of said contact to effect the operation of said apparatus, said means comprising a tuned circuit having an oscillation period in the order of twice the period of said momentary opening interposed between said contact and said apparatus.

4. In a telephone system, a relay, a contact for said relay, apparatus controlled by said contact, and means for prolonging the effect of a momentary opening of said contact to effect the operation of said apparatus, said means comprising a retardation-coil and condenser of such characteristics as to have an oscillation period in the order of twice the period of said momentary opening interposed between said contact and said apparatus.

5. In a telephone system, a relay, a contact for said relay, apparatus controlled by said relay, and means for prolonging the effect of a momentary opening of said contact to effect the operation of said apparatus, said means comprising a retardation-coil and condenser forming an oscillating circuit of such characteristics as to have an oscillation period in the order of twice the period of said momentary opening, and a second relay of such impedance as to form a discharge path for said oscillating circuit when said contact recloses.

6. In a telephone system, a pulsing circuit, a relay responsive to pulses over said circuit, apparatus responsive to said relay, said apparatus having a predetermined period of operation, and means for testing said pulsing circuit for short length pulses, comprising means for prolonging the effect of short pulses to effect the operation of said apparatus.

7. In a telephone system, a pulsing circuit, a relay responsive to pulses over said circuit, apparatus responsive to said relay, said apparatus having a predetermined period of operation, and means for testing said pulsing circuit for short length pulses by prolonging the effect of short pulses so as to effect the operation of said apparatus, said means comprising a tuned circuit interposed between said relay and said apparatus.

8. In a telephone system, a pulsing circuit, a relay responsive to pulses over said circuit, apparatus responsive to said relay, said apparatus having a predetermined period of operation, and means for testing said pulsing circuit for short length pulses by prolonging the effect of short pulses so as to effect the operation of said apparatus, said means comprising a retardation-coil and a condenser in parallel, and a second relay.

9. In a telephone system, a pulsing circuit, a relay responsive to pulses over said circuit, apparatus responsive to said relay, said apparatus having a predetermined period of operation, and means for testing said pulsing circuit for short length pulses by prolonging the effect of short pulses so as to effect the the operation of said apparatus, said means comprising a retardation-coil and a condenser in parallel, and a second relay.

10. In a telephone system, a pulsing circuit, a relay responsive to pulses over said circuit, apparatus responsive to said relay, said apparatus having a predetermined period of operation, and means for testing said pulsing circuit for short length pulses by prolonging the effect of short pulses so as to effect the operation of said apparatus, said means comprising a tuned circuit having an oscillation period in the order of twice the time of said short pulses.

11. In a telephone system, a pulsing circuit, a relay responsive to pulses over said circuit, apparatus responsive to said relay, said apparatus having a predetermined period of operation, and means for testing said pulsing circuit for short length pulses by prolonging the effect of short pulses so as to effect the operation of said apparatus, said means comprising a retardation-coil and condenser of such characteristics as to have an oscillation period in the order of twice the period of said short pulses.

12. In a telephone system, a pulsing circuit, a relay responsive to pulses over said circuit to open its contact, apparatus responsive to said relay, said apparatus having a predetermined period of operation, and means for testing said pulsing circuit for short length pulses by prolonging the effect of short pulses so as to effect the operation of said apparatus, said means comprising a retardation-coil and condenser forming an oscillating circuit of such characteristics as to have an oscillation period in the order of twice the period of said momentary contact openings, and a second relay of such impedance as to form a discharge path for said oscillating circuit when said contact recloses.

13. In a telephone system, a pulsing circuit, registers, means in said circuit for setting said registers in accordance with light pulses of one polarity and heavy pulses of the opposite polarity received over said pulsing circuit, and means also included in said circuit responsive to heavy pulses of said one polarity to render said setting means ineffective.

14. In a telephone system, a pulsing circuit, relays in said pulsing circuit responsive to light pulses of one polarity and heavy pulses of the opposite polarity received over said circuit, registers, means controlled by said relays for setting said registers, another relay in said circuit responsive to heavy pulses of said one polarity, and means controlled by said other relay for disabling said means for setting said registers.

15. In a telephone system, a pulsing circuit, relays in said pulsing circuit responsive to light pulses of one polarity and heavy pulses of the opposite polarity received over said circuit, registers, circuits controlled by said relays for setting said registers, another relay in said circuit responsive to heavy pulses of said one polarity, a signal, and means controlled by said other relay for opening said relay controlled circuits and for displaying said signal.

16. In a telephone system, a pulsing circuit, means for recording a code comprising light pulses of one polarity and heavy pulses of the opposite polarity received over said circuit, means for detecting false heavy pulses of said one polarity comprising a relay included in said pulsing circuit, and means controlled by said relay for thereupon disabling said recording means.

17. In a telephone system, a pulsing circuit, means for recording a code comprising light pulses of one polarity and heavy pulses of the opposite polarity received over said circuit, means for detecting false heavy pulses of said one polarity comprising a relay included in said pulsing circuit, and means controlled by said relay for preventing the recording of subsequent pulses.

18. In a telephone system, a pulsing circuit, means for recording a code comprising light pulses of one polarity and heavy pulses of the opposite polarity received over said circuit, means for detecting false heavy pulses of said one polarity comprising a relay included in said pulsing circuit, an alarm signal, and means controlled by said relay for displaying said alarm signal and for preventing the recording of subsequent pulses.

In witness whereof, I hereunto subscribe my name this 13th day of December, A. D. 1927.

CHARLES R. MEISSNER.